Aug. 31, 1954　　F. M. JACKSON　　2,687,801
POTATO GRADER

Filed July 25, 1952　　2 Sheets-Sheet 1

INVENTOR.
FRED M. JACKSON,
BY
McMorrow, Berman & Davidson
ATTORNEYS.

Aug. 31, 1954    F. M. JACKSON    2,687,801
POTATO GRADER
Filed July 25, 1952    2 Sheets-Sheet 2
FIG. 2.
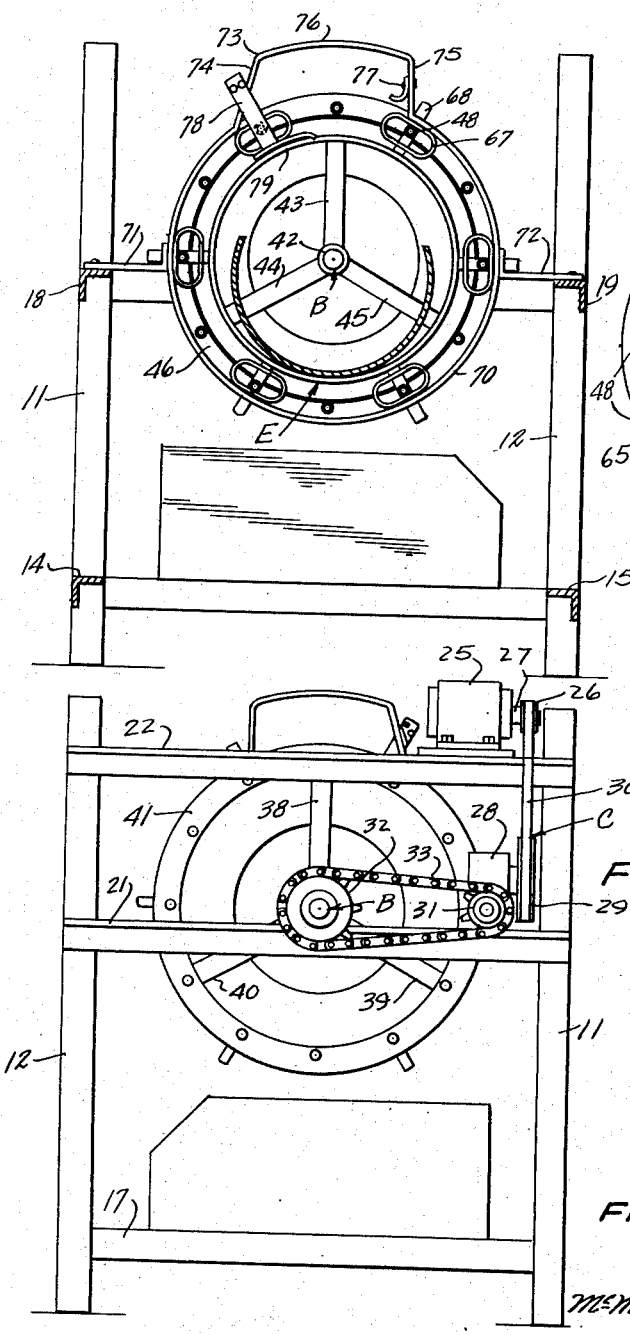
FIG. 4.
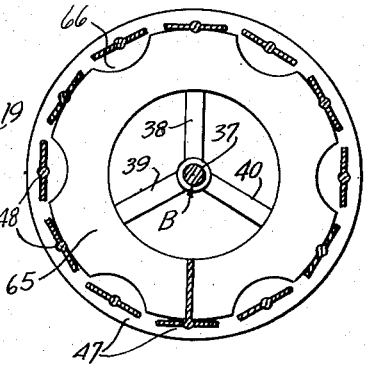
FIG. 3.
INVENTOR.
FRED M. JACKSON.
BY
McMorrow, Berman + Davidson
ATTORNEYS.

Patented Aug. 31, 1954

2,687,801

UNITED STATES PATENT OFFICE 2,687,801

POTATO GRADER

Fred M. Jackson, Federalsburg, Md.

Application July 25, 1952, Serial No. 300,823

4 Claims. (Cl. 209—98)

This invention relates to potato graders and more particularly to a device for mechanically grading or sorting steamed or lye peeled sweet potatoes into grades or quantities of potatoes with the potatoes in each grade of substantially the same size and different sized potatoes in different grades, although it may be used for sorting various kinds of fruits and vegetables and grading the fruits or vegetables according to size.

It is among the objects of the invention to provide an improved potato grader which will receive potatoes, such as steamed or lye peeled sweet potatoes, and separate the potatoes into different groups with potatoes of substantially the same size in each group; which will handle the steamed or peeled potatoes without material damage to the potatoes; which maintains itself clear of choking or clogging conditions and returns potatoes from a clogging position to the ungraded mass of potatoes within the device; which will sort or grade potatoes or other objects accurately and at a rapid rate; and which is simple and durable in construction, economical to manufacture, easy to use, and positive and effective in operation.

Other objects and advantages will become apparent from a consideration of the following description and the appended claims in conjunction with the accompanying drawings, wherein:

Figure 2 is a transverse cross sectional view on the line 2—2 of Figure 1;

Figure 3 is an end elevational view looking at the right-hand end of the grader as viewed in Figure 1;

Figure 4 is a transverse cross sectional view of the grading cylinder of the device taken on the line 4—4 of Figure 1;

Figure 1:
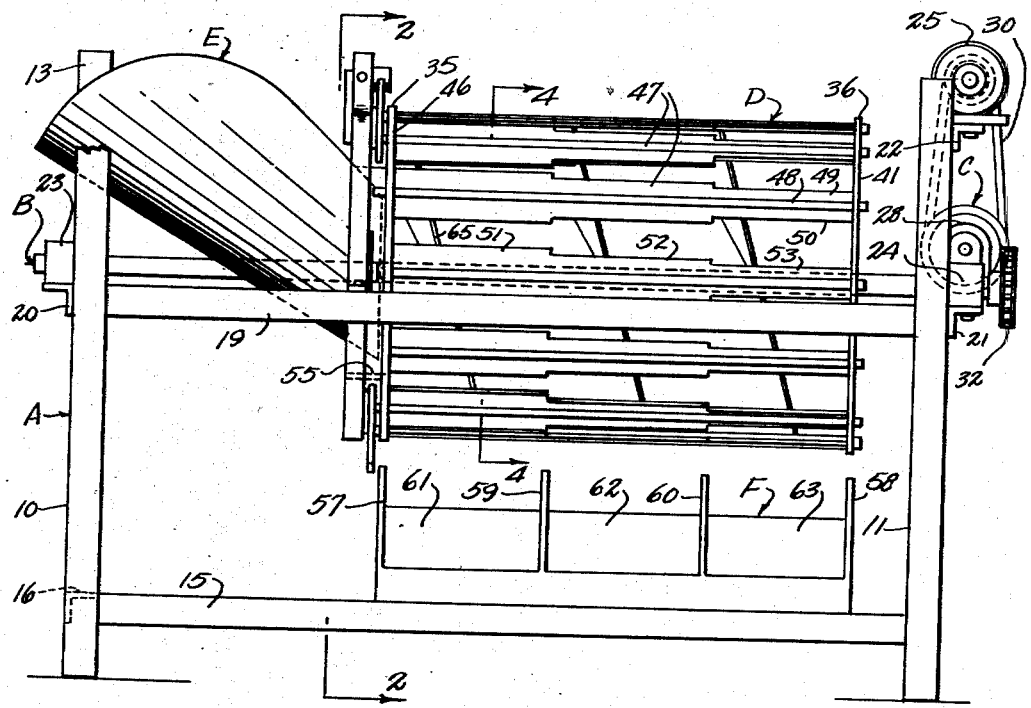
Figure 1 is a side elevational view of a potato grader illustrative of the invention.
Figure 5:
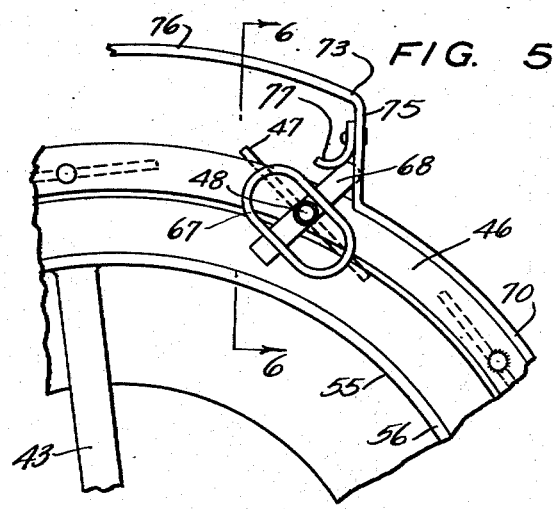
Figure 5 is a fragmentary end elevational view on an enlarged scale of the grading cylinder looking at the same end of the cylinder as that illustrated in Figure 2, but showing the parts in a different operative position.
Figure 6:
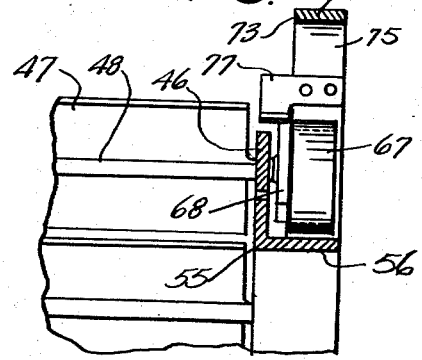
Figure 6 is a fragmentary cross sectional view on the line 6—6 of Figure 5.

With continued reference to the drawings, the grading device or machine comprises, in general, a supporting frame A, a shaft B journaled on the frame and disposed substantially horizontally therein, power mechanism C mounted on the frame and drivingly connected to the shaft B, a grading cylinder D coaxially mounted on the shaft B, a feed trough E mounted on the frame and downwardly inclined into one end of the grading cylinder D, and a bin structure F mounted on the frame below the grading cylinder to receive the graded potatoes from the cylinder.

The frame A is illustrated as formed of structural angle iron members, although it may be formed of other structural members, if desired, and is of rectangular shape including four vertically disposed posts 10, 11, 12 and 13, lower side members 14 and 15 connected between the posts 10 and 11, and 12 and 13 respectively, near the lower ends of the posts and substantially horizontally disposed, lower end members 16 and 17 connected between the posts 10 and 13, and the posts 11 and 12 respectively, substantially in the plane of the lower side members 14 and 15, upper side members 18 and 19 disposed above and substantially parallel to the lower side members 14 and 15 respectively, and connected to the posts in the same manner as the lower side members, upper end members 20 and 21 secured to the posts at the opposite ends of the upper side members 18 and 19 and a top end member 22 disposed above and substantially parallel to the upper end member 21 and secured to the posts 11 and 12.

Bearing blocks 23 and 24 are mounted on the upper end members 20 and 21 respectively, substantially at the mid-length location of these end members and the shaft B is journaled near its respectively opposite ends in the bearings 23 and 24 and is disposed substantially horizontally in the frame A parallel to the upper side members 18 and 19.

The power operated means C drivingly connected to the shaft B is illustrated as comprising an electric motor 25 of suitable horsepower mounted on the top end member 22 of the frame and carrying a belt pulley 26 on its shaft 27, a speed reducing transmission 28 mounted on the upper end member 21 below the top end member 22 and carrying on its input shaft a belt pulley 29 larger than the belt pulley 26, a belt 30 drivingly connecting the pulley 26 to the pulley 29, a chain sprocket 31 on the output shaft of the transmission 28, a chain sprocket 32 on the corresponding end of the shaft B, and a link chain 33 drivingly connecting the sprocket 31 to the sprocket 32, so that the shaft B is driven at a reduced speed from the motor 25. There will, of course, be a suitable energizing circuit, not illustrated, for the motor 25, and this circuit will include the usual motor starting and stopping switch mechanism and it is preferred that the motor be not reversible.

The grading cylinder D comprises cylinder heads 35 and 36 mounted on the shaft B in spaced apart relationship to each other. The head 36 comprises a hub 37 mounted on the shaft adjacent the bearing block 24, spokes 38, 39 and 40 projecting radially from the hub 37 at equal angular intervals around the hub, and a flat annular ring 41 secured to the spokes 38, 39 and 40 at the outer ends of the spokes and disposed concentrically of the shaft B and perpendicular to the longitudinal center line of the shaft.

The head 35 comprises a hub 42 mounted on the shaft B at a location intermediate the length of the shaft, spokes 43, 44 and 45 projecting radially from the hub 42 at equal angular intervals around the hub, and a flat circular ring 46 secured to the spokes 43, 44 and 45 at the outer ends of the spokes and disposed concentrically of the shaft and perpendicular to the longitudinal center line thereof.

Slats 47 extend between the cylinder heads 35 and 36 in spaced apart and substantially parallel relationship to each other and each of these slats comprises a rod-like center portion of circular cross sectional shape, as indicated at 48, the ends of which are received in and journaled in apertures provided in the flat rings 41 and 46, the apertures in each ring being spaced apart at substantially equal angular intervals and corresponding apertures in the two rings being mutually aligned longitudinally of the shaft B. It will be noted that all of the slats 47 are pivotally mounted at their opposite ends in the cylinder heads 35 and 36. Alternate slats are capable of rocking movement in a manner hereinafter explained.

In the arrangement illustrated, there are twelve slats equally spaced apart around the rings 46 and 41, and each slat includes, in addition to its rod-like center portion 48, flat wing portions 49 and 50 disposed at respectively opposite sides of the center portion thereof and extending outwardly from the center portion in substantially tangential relationship to a cylindrical surface which includes the inner edges of the rings 46 and 41.

Each slat includes three sections, as indicated at 51, 52 and 53 of respectively different widths and of substantially equal length disposed in end to end relationship with the widest section 51 adjacent the ring 46, the narrowest section 53 adjacent the ring 41, and the section 52 of intermediate width disposed between the sections 51 and 53. This provides, between each two adjacent slats, a space having longitudinal sections of different widths disposed in end to end relationship with the narrowest section of each space adjacent the ring 46, the widest section adjacent the ring 36, and the section of intermediate width between the sections of minimum and maximum width, so that potatoes or other objects to be graded, when fed into the cylinder through the head 35, will be sorted in a manner such that the smaller objects will fall through the portions of the spaces between adjacent slats nearest the ring 46, objects of intermediate size will fall through the portions of the spaces intermediate the length of the cylinder, and objects of maximum size will be carried to the end of the cylinder adjacent the ring 41 and will fall through the space portions of maximum width. Objects of a size too large to be discharged through the space sections of maximum width may be discharged from the end of the cylinder through the head 36.

An annular ring 55 of right angular cross sectional shape is disposed within and secured to the flat ring 46 with one leg or flange substantially in the plane of the ring 46 and its other leg or flange projecting outwardly from the ring 46 in a direction away from the other head 36 of the cylinder. The feed trough E is mounted on the frame A in such a manner that one end is disposed between the posts 10 and 13 above the upper end member 20 and the trough is inclined downwardly toward the cylinder D and has its other end disposed within the cylindrical flange 56 of the ring 55 to feed potatoes into the cylinder D for grading.

The bin structure F has transverse end walls 57 and 58 and is divided by transverse partition walls 59 and 60 into three compartments 61, 62 and 63 of substantially equal lengths, disposed respectively below the sections of minimum, intermediate and maximum widths of the spaces between adjacent slats 47 of the grading cylinder, so that objects falling through the corresponding sections of the spaces will fall into the appropriate compartments of the bin structure from which they may be removed for further processing, storage, or transportation.

A spiral vane structure 65 is disposed within the cylinder D and winds in auger fashion from the head 35 of the cylinder to the head 36 circumspatially of the shaft B in such a direction that it forces the objects in the cylinder to move in a direction from the head 35 toward the head 36 as the cylinder rotates. This spiral vane structure 65 is preferably independent of the slats 47 and is provided with peripheral recesses, as indicated at 66 in Figure 4, inwardly of alternate slats 47 of the grading cylinder.

The alternate slats adjacent the peripheral depressions in the spiral vane structure are rockable in the cylinder heads 35 and 36, and the center rods 48 of these slats project through the ring 46. Hollow cam structures 67 of elliptical shape are mounted one on each of the rods 48 of the alternate slats 47 and are disposed at the outer side of the ring 46. These cams are secured substantially at the mid-length location of one of the sides thereof to the corresponding rod members with the rod members disposed inside of the hollow cam structures, and a lever, as indicated at 68, is secured to and extends transversely across each of the elliptical cam members 67 and projects radially outwardly of the peripheral edge of the ring 46. As stated above, the alternate slats on which the cam members 67 are mounted are angularly rockable in the ring members 46 and 41, but the remaining slats are held against substantial rocking movement by contact thereof with the peripheral edge of the spiral vane structure 65.

A cam guide 70 in the form of a circular band of substantially cylindrical shape is disposed adjacent the outer side of the ring 46 with its inner surface substantially flush with the peripheral edge of the ring 46 and this cam guide is secured in position by arms 71 and 72 extending from the upper side members 18 and 19 of the frame to the cam guide at substantially diametrically opposite locations around the cam guide and rigidly secured to the frame side members and the cam guide. As the cylinder D rotates, the outer sides of the elliptical cams 67 slide around the inner surface of the cylindrical cam guide 70 and the cams hold the associated slats in position in which they are transversely substantially tangential to a cylindrical surface including the inner edges of the rings 46 and 41.

At the top of the cylinder D the cam guide 70 is provided with an upwardly arched portion 73 of somewhat rectangular shape having legs 74 and 75 and an intermediate portion 76. The cam 67 and lever 68 approach the leg 75 first during the rotation of the cylinder, and an abutment or tongue 77 is mounted on this leg and is engaged by the levers 68 at the outer ends of these levers as the levers are moved past the tongue by the rotation of the cylinder. Engagement of the levers 68 with the tongue 77 causes the corresponding slats to rock about their pivotal mountings in the rings 46 and 41, thereby dislodging from the slats any potatoes which may have become jammed between adjacent slats, causing these potatoes to fall back onto the mass of ungraded potatoes in the cylinder and clear the slats of their clogged or choked condition.

A bar 78 is mounted on the leg 74 of the arched portion 73 of the cam guide and extends inwardly of the ring 46. This bar carries a shoe 79 on its inner end which shoe engages the inner sides of the cams 67 as the cams are moved past the shoe by the rotation of the cylinder D and this engagement of the cams with the shoe 79 restores the slats to their normal positions. After the cams pass the shoe 79 the outer sides of the cams come into engagement with the inner side of the cam guide 70 and the slats are held in normal position as they move from the leg 74 back to the leg 75 of the arched portion of the cam guide.

The grading device is continuous in operation and, as potatoes or other objects are fed into the grading cylinder D through the feed trough E they are dispensed out of the cylinder in graded sizes into the corresponding compartments of the bin structure F.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a potato grader including a supporting frame, bearing blocks mounted on said frame, a shaft journaled in said bearing blocks and disposed in substantially horizontal position in said frame, power means drivingly connected to said shaft and a bin structure mounted on said frame below said shaft, a grading cylinder structure mounted on said shaft coaxially thereof and comprising cylinder head structures concentrically mounted on said shaft at spaced apart locations therealong and each including a hub, spokes projecting radially from said hub and a flat ring secured to said spokes at the outer ends thereof, slats extending between and journaled at their ends in said rings and disposed in spaced apart and substantially parallel relationship to each other, each of said slats including longitudinally extending portions of different widths disposed in end to end relationship to each other between said rings, a fixed ring of substantially circular shape mounted on said frame and disposed adjacent one of said heads, means carried by some of said slats and engaging said fixed ring to hold the corresponding slats in operative position in said cylinder, interengaging means carried by said slats and said fixed ring effective to rock said slats at a predetermined position in the rotation of said cylinder, and a feed trough mounted on said frame and extending into one end of said cylinder structure.

2. In a potato grader including a supporting frame, bearing blocks mounted on said frame, a shaft journaled in said bearing blocks and disposed in substantially horizontal position in said frame, power means drivingly connected to said shaft and a bin structure mounted on said frame below said shaft, a grading cylinder structure mounted on said shaft coaxially thereof and comprising cylinder head structures concentrically mounted on said shaft at spaced apart locations therealong and each including a hub, spokes projecting radially from said hub and a flat ring secured to said spokes at the outer ends thereof, slats extending between and journaled at their ends in said rings and disposed in spaced apart and substantially parallel relationship to each other, each of said slats including longitudinally extending portions of different widths disposed in end to end relationship to each other between said rings, a fixed ring of substantially circular shape mounted on said frame and disposed adjacent one of said heads, means carried by some of said slats and engaging said fixed ring to hold the corresponding slats in operative position in said cylinder, interengaging means carried by said slats and said fixed ring effective to rock said slats at a predetermined position in the rotation of said cylinder, and a feed trough mounted on said frame and extending into one end of said cylinder structure, said means engaging said fixed ring comprising cam structures of substantially elliptical shape secured one on each of the corresponding slats at the ends of such slats adjacent said fixed ring, and said interengaging means comprising a tongue mounted on said fixed ring and levers mounted one on each of said cam structures and successively brought into engagement with said tongue by rotation of said cylinder to rock the corresponding slats about their longitudinal center lines as axes.

3. A potato grader comprising a supporting frame, a shaft journaled near its opposite ends on said frame and disposed in substantially horizontal position therein, power means drivingly connected to said shaft at one end thereof, a grading cylinder structure mounted on said shaft coaxially thereof, a feed trough mounted on said frame and extending into one end of said cylinder structure, and a bin structure mounted on said frame below said cylinder structure for receiving graded potatoes from the latter, said grading cylinder structure comprising cylinder heads mounted on said shaft at spaced apart locations therealong, slats extending between said heads in spaced apart and substantially parallel relationship to each other and pivotally mounted at their opposite ends in said cylinder heads near the outer edges of the latter, alternate slats having means cooperating with means on said frame to impart rocking movement to each of said alternate slats at a predetermined angular position thereof in the rotation of said cylinder, and a spiral vane structure disposed immediately within said slats and wound in auger fashion from one of said heads to the other.

4. A potato grader comprising a supporting frame, a shaft journaled near its opposite ends on said frame and disposed in substantially horizontal position therein, power means drivingly connected to said shaft at one end thereof, a grading cylinder structure mounted on said shaft coaxially thereof, a feed trough mounted on said frame and extending into one end of said cylinder structure, and a bin structure mounted on said frame below said cylinder structure for receiving graded potatoes from the latter, said grading cylinder structure comprising cylinder heads mounted on said shaft at spaced apart locations therealong, slats extending between said heads in spaced apart and substantially parallel relationship to each other and pivotally mounted at their opposite ends in said cylinder heads near the outer edges of the latter, a spiral vane structure disposed immediately within said slats and wound in auger fashion from one of said heads to the other, said vane structure being recessed to provide freedom of rocking movement of alternate slats around said cylinder about their longitudinal center lines as axes, guide means mounted on said frame adjacent one of said heads, an abutment carried by said guide means, and means mounted on said alternate slats and actuated by said abutment carried by said guide means to impart a rocking movement to each of said alternate slats at a predetermined angular position thereof in the rotation of said cylinder.

References Cited in the file of this patent

UNITED STATES PATENTS

| Number | Name | Date |
|---|---|---|
| 489,650 | Hogg | Jan. 10, 1893 |
| 770,079 | Lamb | Sept. 13, 1904 |
| 1,185,770 | Cody | June 6, 1916 |
| 1,610,350 | Anderson | Dec. 14, 1926 |
| 1,677,862 | Herrold | July 17, 1928 |
| 1,703,591 | Olney | Feb. 26, 1929 |

FOREIGN PATENTS

| Number | Country | Date |
|---|---|---|
| 593,266 | France | May 20, 1925 |